United States Patent
Suzuki

(10) Patent No.: US 7,100,731 B2
(45) Date of Patent: Sep. 5, 2006

(54) WEIGHT DETECTING SYSTEM FOR AN OCCUPANT OF A SEAT

(75) Inventor: Yoshitaka Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 237 days.

(21) Appl. No.: 10/723,384

(22) Filed: Nov. 25, 2003

(65) Prior Publication Data

US 2004/0154841 A1  Aug. 12, 2004

(30) Foreign Application Priority Data

Nov. 27, 2002  (JP) ............................. 2002-343522

(51) Int. Cl.
*B60R 21/16* (2006.01)

(52) U.S. Cl. .................. 180/273; 280/735; 177/144; 177/211

(58) Field of Classification Search ................ 180/273; 280/735; 177/136, 144, 211, 229
See application file for complete search history.

(56) References Cited

U.S. PATENT DOCUMENTS

| | | | |
|---|---|---|---|
| 3,949,822 A * | 4/1976 | English et al. ............... | 177/126 |
| 6,039,344 A * | 3/2000 | Mehney et al. ............. | 280/735 |
| 6,407,350 B1 * | 6/2002 | Blakesley .................... | 177/211 |
| 6,841,741 B1 * | 1/2005 | Kajiyama ................... | 177/144 |

FOREIGN PATENT DOCUMENTS

| | | | |
|---|---|---|---|
| JP | 09-257601 A | * | 10/1997 |
| JP | 2002-160571 | | 6/2004 |
| JP | 2004-205410 A | * | 7/2004 |

* cited by examiner

*Primary Examiner*—Randy W. Gibson
(74) *Attorney, Agent, or Firm*—Hamre, Schumann, Mueller & Larson, P.C.

(57) ABSTRACT

A weight-detecting system for detecting the weight of an occupant sitting on a seat includes inner and outer weight-detecting units. The outer weight-detecting unit includes strain resistors mounted on a lower surface of its sensor plate. The inner weight-detecting unit includes strain resistors mounted on an upper surface of its sensor plate. When output voltages from the outer weight-detecting unit are represented by A and B, and output voltages from the inner weight-detecting unit are represented by C and D, the weight of an occupant is detected based on a value A+B+C'+D' provided by adding output voltages C' and D' resulting from the inversion of the output voltages C and D to the output voltages A and B. The weight-detecting units have the same characteristic of change in output voltages with respect to change in temperature. Therefore, when the output voltage (A+B) is added to the output voltage (C'+D'), a detection error due to a change in temperature can be countervailed. Thus, the weight of the occupant sitting on a seat can be detected accurately without being influenced by the change in temperature.

8 Claims, 12 Drawing Sheets

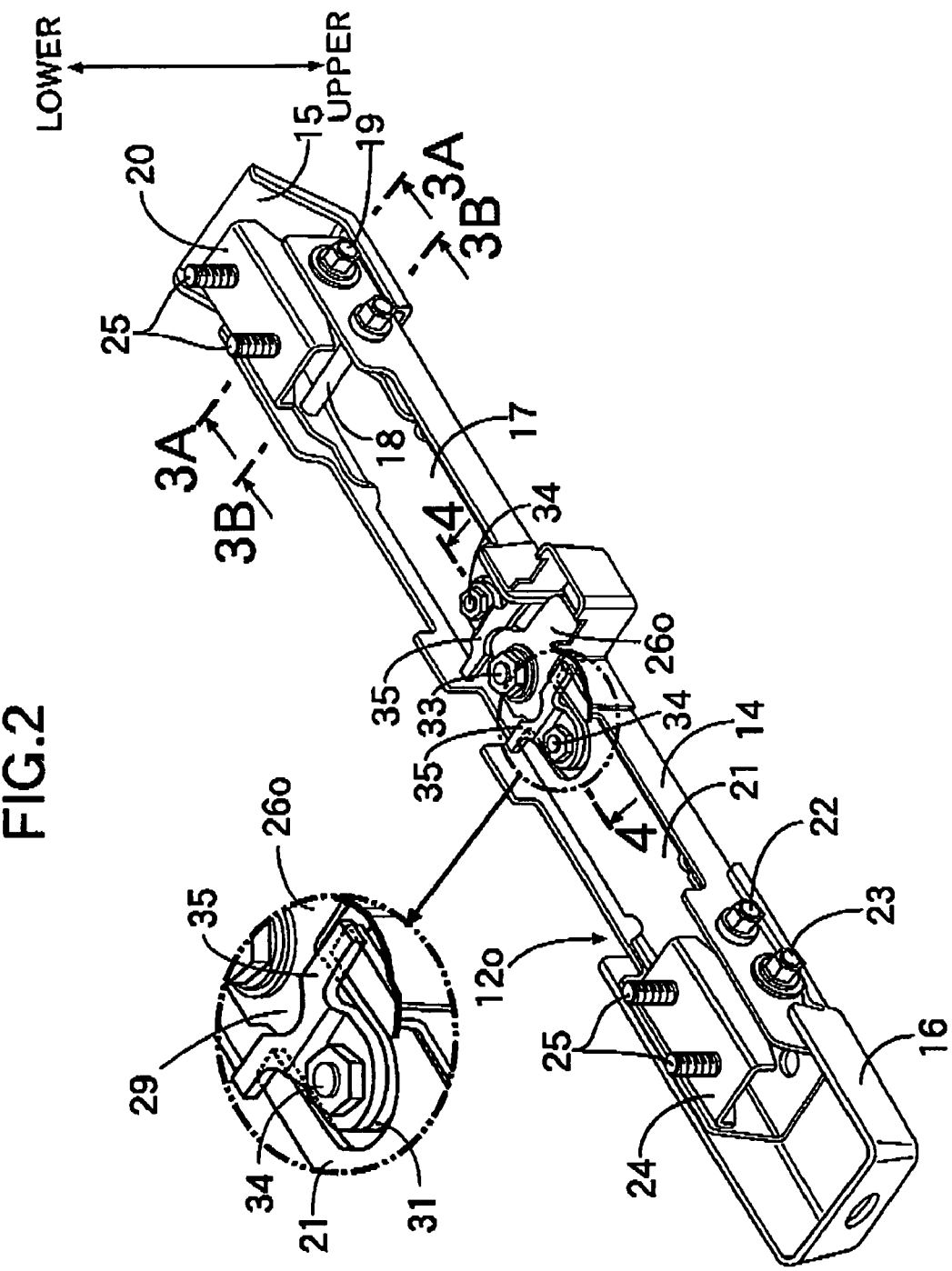

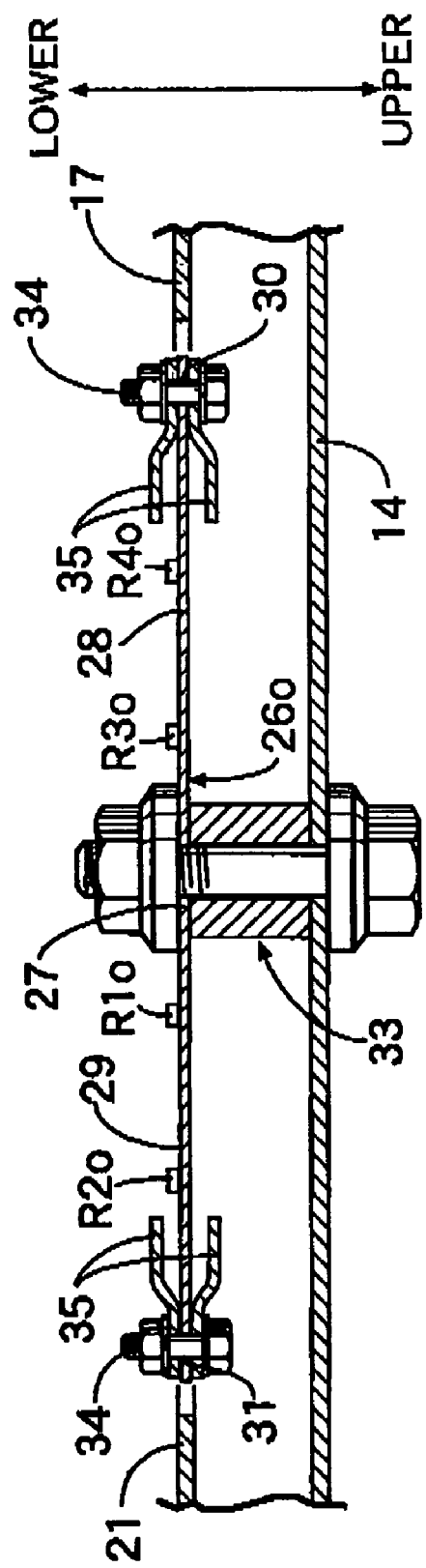

OUTER WEIGHT-DETECTING UNIT

FIG13A

OUTPUT VOLTAGE A,B

LOAD CHARACTERISTIC

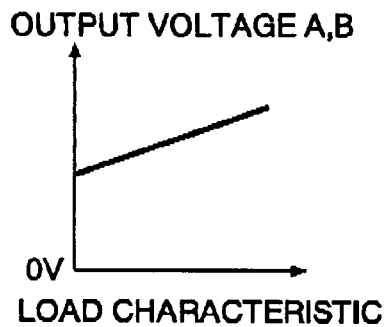

FIG13B

OUTPUT VOLTAGE A,B

TEMPERATURE CHARACTERISTIC

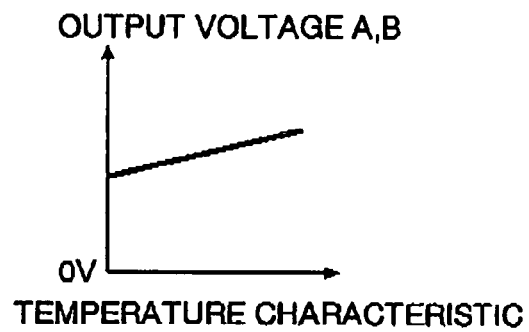

FIG14A

OUTPUT VOLTAGE C,D

LOAD CHARACTERISTIC

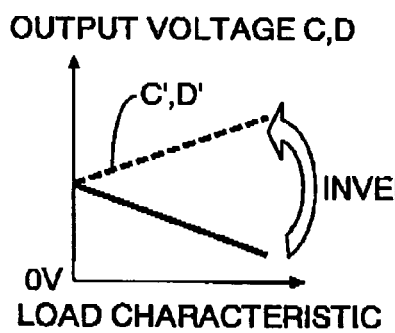

FIG14B

OUTPUT VOLTAGE C,D

TEMPERATURE CHARACTERISTIC

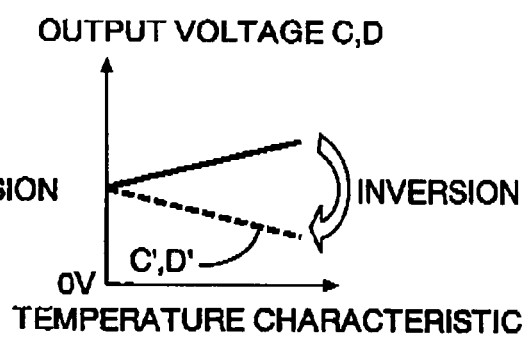

FIG15A

OUTPUT VOLTAGE A+B+C'+D'

LOAD CHARACTERISTIC

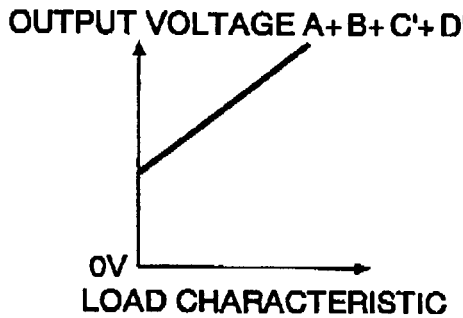

LOAD CHARACTERISTICS ARE EQUIVALENT TO THOSE WHEN STRAIN RESISTORS ARE MOUNTED ON LOWER SURFACE

FIG15B

OUTPUT VOLTAGE A+B+C'+D'

TEMPERATURE CHARACTERISTIC

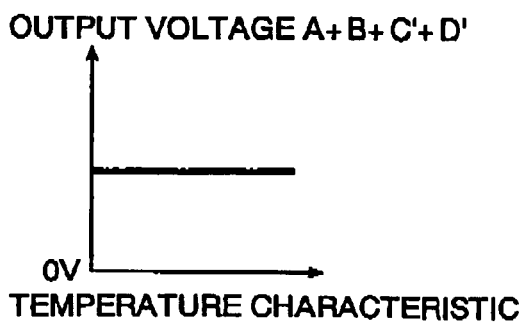

TEMPERATURE CHARACTERISTIC ARE COUNTERVAILED

WEIGHT DETECTING SYSTEM FOR AN OCCUPANT OF A SEAT

BACKGROUND OF THE INVENTION

1. Field of the Invention

The present invention relates to an occupant's weight detecting system for detecting the weight of an occupant sitting on a seat of a vehicle and using an allotment method with at least first and second weight-detecting units.

2. Description of the Related Art

The operation and non-operation of an air bag device for an occupant on a passenger seat, the magnitude of the speed of deployment of an air bag and the like are controlled depending on the physique of the occupant sitting on the passenger seat and the presence or absence of the occupant, i.e., depending on the status of the occupant. For example, when the occupant is an adult or a child, the air bag device is operated, and when the occupant is a baby or infant sitting on a seat or when no occupant sits on the seat, the air bag is not operated. Further, even when the air bag device is operated, the deployment of the air bag is controlled so that, when the occupant is an adult, the air bag is deployed at a high speed, and when the occupant is a child, the air bag is deployed at a low speed. Thus, it is possible to ensure that the air bag device exhibits an optimal restraint performance corresponding to the status of an occupant. Also, it is possible to avoid unnecessary deployment of the air bag.

A status-determining device for determining a status based on an occupant's weight detected by a plurality of weight sensors mounted in a seat, is known from Japanese Patent Application Laid-open No. 2002-160571. The status-determining device is designed so that outputs from the weight sensors are corrected based on a temperature detected by a temperature sensor in order to compensate for changes in outputs from the weight sensors.

In the above-described conventional status-determining device including a plurality of weight sensors, when a door is opened and cold air flows into a vehicle compartment during heating of the vehicle compartment, a sudden change in temperature occurs, so that differences are generated among the temperatures of the plurality of weight sensors. Therefore, it is difficult to appropriately correct a difference between temperatures of two strain resistors constituting one weight sensor, for example, by a single temperature sensor.

SUMMARY OF THE INVENTION

Accordingly, it is an object of the present invention to ensure that the weight of an occupant sitting on a seat is detected accurately without being influenced by a change in temperature.

To achieve the above object, according to a first feature of the present invention, there is provided an occupant's weight detecting system for detecting the weight of an occupant sitting on a seat of a vehicle in an allotment manner at least by first and second weight-detecting units, wherein an output from the first weight-detecting unit is increased with an increase in weight, and an output from the second weight-detecting unit is decreased with the increase in weight, and the first and second weight-detecting units have the same characteristic of change in outputs with respect to change in temperature, whereby the weight of the occupant is detected based on a value obtained by inverting the output from one of the first and second weight-detecting units and adding the inverted output to the output from the other weight-detecting unit.

With the above arrangement, of the first and second weight-detecting units for detecting the weight of the occupant sitting on the seat of the vehicle in the allotment manner, the first output from the first weight-detecting unit is increased with the increase in weight, and the second output from the second weight-detecting unit is decreased with the increase in weight, and the first and second weight-detecting units have a similar characteristic of change in outputs with respect to change in temperature. The second output changes inversely at a rate similar to the rate at which the first output changes as weight changes. Therefore, when the occupant's weight is detected based on outputs from the first and second weight-detecting units, changes in outputs from the first and second weight-detecting units due to a change in temperature are countervailed. As a result, it is possible to accurately detect the occupant's weight, irrespective of a sudden change in temperature.

According to a second feature of the present invention, in addition to the arrangement of the first feature, the first and second weight-detecting units include strain resistors fixed to surfaces of sensor plates adapted to be flexed by the occupant's weight, the strain resistors of the first weight-detecting unit being fixed to a first surface of the first sensor plate, and the strain resistors of the second weight-detecting unit being fixed to a second surface of the second sensor plate, the second surface being vertically opposite from the first surface.

With the above arrangement, each of the first and second weight-detecting units comprises the sensor plate adapted to be flexed by the occupant's weight and the strain resistors fixed to the surfaces of the sensor plate. The strain resistors of the first weight-detecting unit are fixed to the first surface of the first sensor plate thereof, and the strain resistors of the second weight-detecting unit are fixed to the second surface, which is vertically opposite from the first surface, of the second sensor plate thereof. Therefore, the output from the first weight-detecting unit is increased and the output from the second weight-detecting unit is decreased, in accordance with an increase in weight.

According to a third feature of the present invention, in addition to the arrangement of the second feature, the first weight-detecting unit and the second weight-detecting unit commonly use a sensor plate.

With the above arrangement, the sensor plate is commonly used by the first and second weight-detecting units, which can contribute to a reduction in number of parts.

An outer weight-detecting unit $12o$ corresponds to the first weight-detecting unit of the present invention, and an inner weight-detecting unit $12i$ corresponds to the second weight-detecting unit of the present invention.

The above and other objects, features and advantages of the invention will become apparent from the following description of the preferred embodiment taken in conjunction with the accompanying drawings.

BRIEF DESCRIPTION OF THE DRAWINGS

FIG. 2 is a view of the weight-detecting unit taken from the side of its lower face.

FIG. 4 is an enlarged sectional view taken along a line 4—4 in FIG. 2.

FIGS. 13A and 13B are graphs showing changes in output voltages from the outer weight-detecting unit with respect to the load and the temperature.

FIGS. 14A and 14B are graphs showing changes in output voltages from the inner weight-detecting unit with respect to the load and the temperature.

FIGS. 15A and 15B are diagrams illustrating a principle for compensating for changes in output voltages from the weight detecting units with respect to the temperature.

DESCRIPTION OF THE PREFERRED EMBODIMENT

The present invention will now be described by way of a preferred embodiment with reference to the accompanying drawings.

FIGS. 6, 7A, 8A and 10A are schematic diagrams for illustrating the principal of the embodiment, and do not correspond to the actual structure of the embodiment shown in FIGS. 2 and 4.

Figure 1:
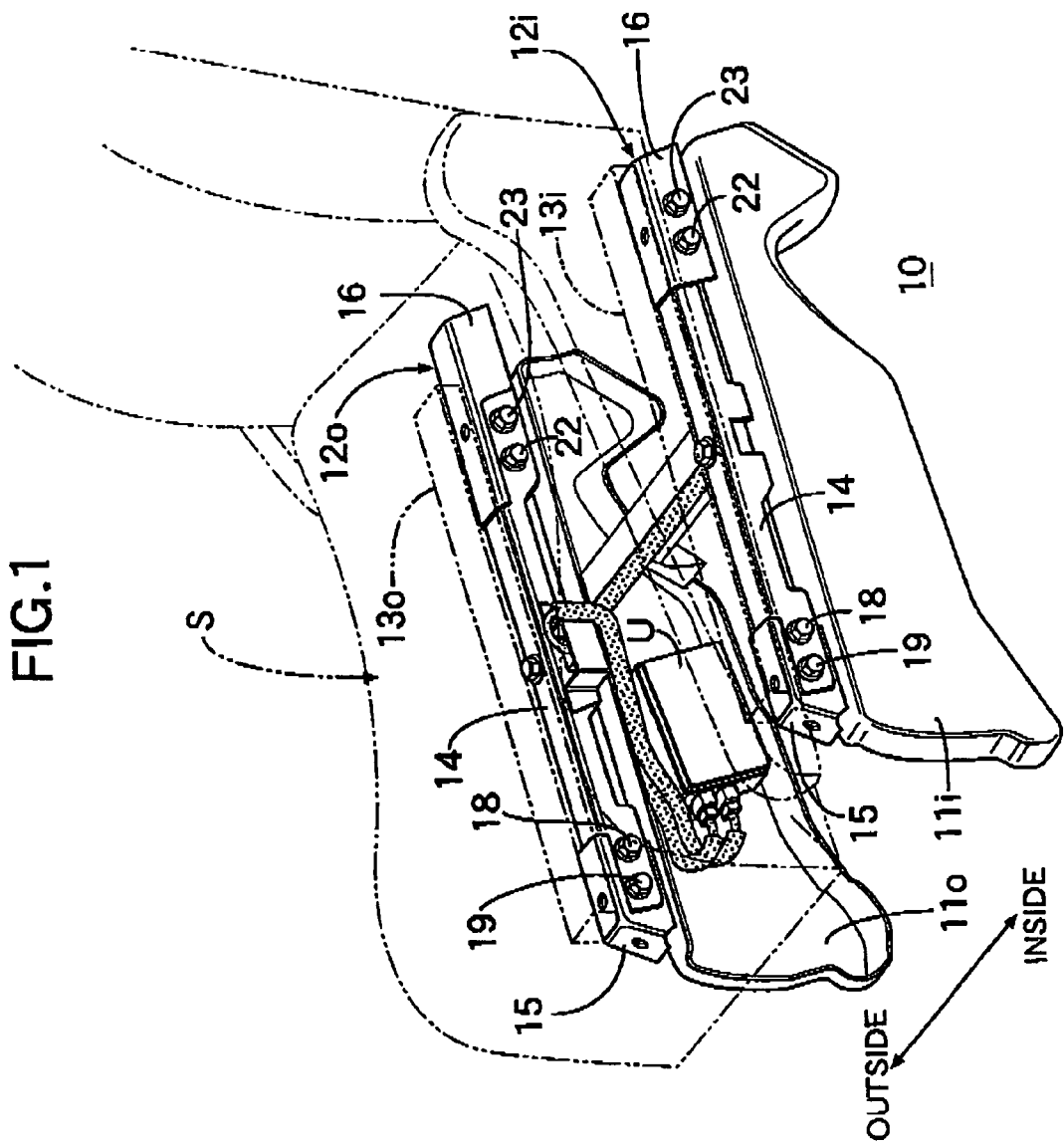
FIG. 1 is a perspective view of a weight-detecting system mounted in a seat according to an embodiment of the present invention.

Referring to FIG. 1, a pair of base members $11o$ and $11i$ are fixed to a floor of an automobile 10. A pair of weight-detecting units $12o$ and $12i$ are mounted along upper surfaces of the base members $11o$ and $11i$. A seat S is longitudinally movably supported on a pair of seat rails $13o$ and $13i$ fixed to upper surfaces of the weight-detecting units $12o$ and $12i$. A subscript symbol A designates a member existing on an outer side in a widthwise direction of the vehicle, and a subscript character i designates a member existing on an inner side in the widthwise direction of the vehicle.

FIG. 2 is a view from below of the weight-detecting unit $12o$ existing on the outer side in the widthwise direction of the vehicle.

Figure 3A:
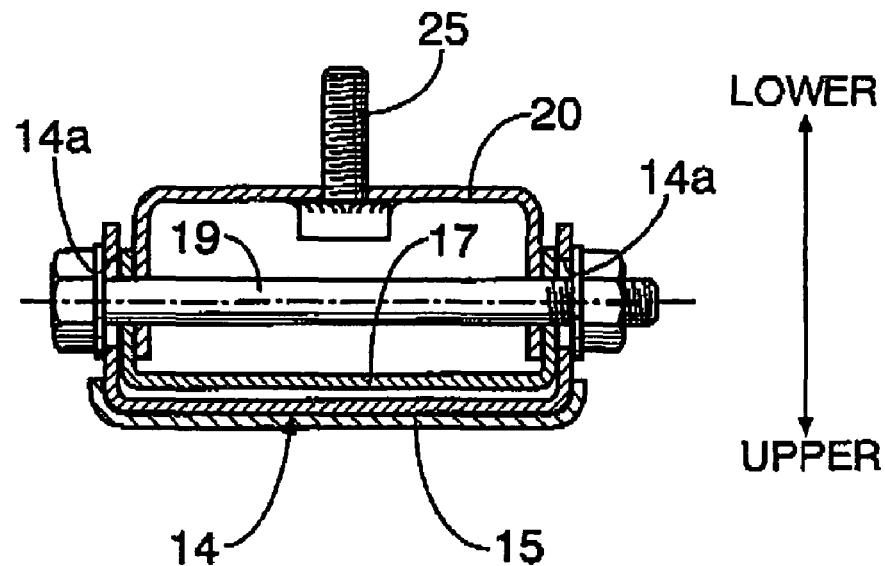
FIG. 3A is an enlarged sectional view taken along a line 3A—3A in FIG. 2.
Figure 3B:
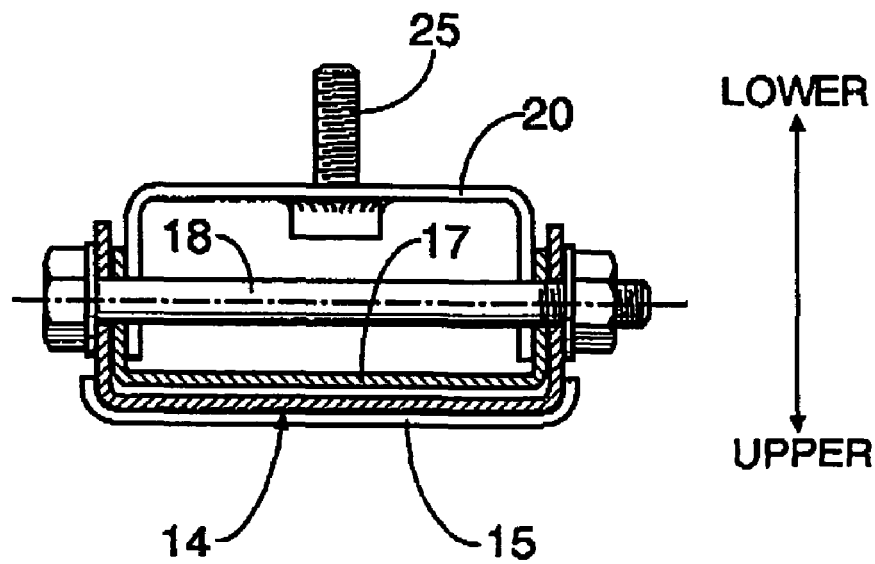
FIG. 3B is an enlarged sectional view taken along a line 3B—3B in FIG. 2.

As can be seen from FIGS. 2 and 3, the weight-detecting unit $12o$ includes a sensor housing 14 having a groove-shape in section with its lower surface opened. The sensor housing 14 is provided at its front and rear ends with front and rear brackets 15 and 16 to which the seat rail $13o$ is coupled. A front arm member 17 is accommodated in a front half of the sensor housing 14, and pivotally supported by a support pin 18 on the sensor housing 14 at a location closer to a front portion. A front load-receiving member 20 is supported by a bolt 19 at a front end of the front arm member. Likewise, a rear arm member 21 is accommodated in a rear half of the sensor housing 14, and pivotally supported by a support pin 22 on the sensor housing 14 at a location closer to a rear portion. A rear load-receiving member 24 is supported by a bolt 23 at a rear end of the rear arm member 21. The bolts 19 and 23 pass through elongated bores 14a formed in the sensor housing 14. Each of the front and rear load-receiving members 20 and 24 is fixed to an upper surface of the base member $11o$ by two bolts 25, 25.

Figure 5:
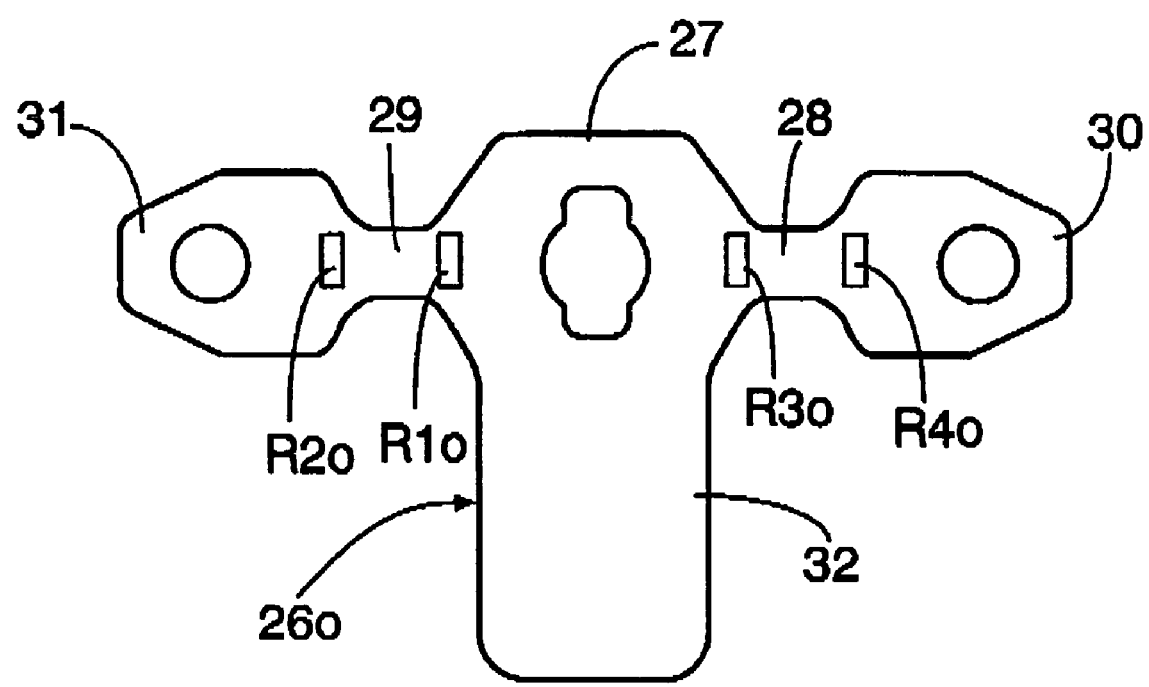
FIG. 5 is a view of a lower surface of a sensor plate.

As can be seen also from FIGS. 4 and 5, a generally T-shaped sensor plate $26o$ is mounted at a central portion of the sensor housing 14. The sensor plate $26o$ includes flexing portions 28 and 29 leading to front and rear portions of a first fixing portion 27, second fixing portions 30 and 31 leading to front and rear portions of the flexing portions 28 and 29, and a base plate portion 32 leading to a side of the first fixing portion 27. The first fixing portion 27 is fixed through a center post 33 to the sensor housing 14. Two upper and lower connecting plates 35, 35 fixed by a bolt 34 to the front second fixing portion 30 are secured at a rear end of the front arm member 17, while two upper and lower connecting plates 35, 35 fixed 31 by a bolt 34 to the rear second fixing portion are secured at a front end of the rear arm member 21.

Two strain resistors $R1o$ and $R2o$ are mounted on a lower surface (a surface opposite from the sensor housing 14) of the rear flexing portion 29 of the sensor plate $26o$. Two strain resistors $R3o$ and $R4o$ are mounted on a lower surface (a surface opposite from the sensor housing 14) of the front flexing portion 28. Various electronic parts (not shown) connected to the four resistors $R1o$ to $R4o$ are connected to the base plate portion 32.

Figure 8A:
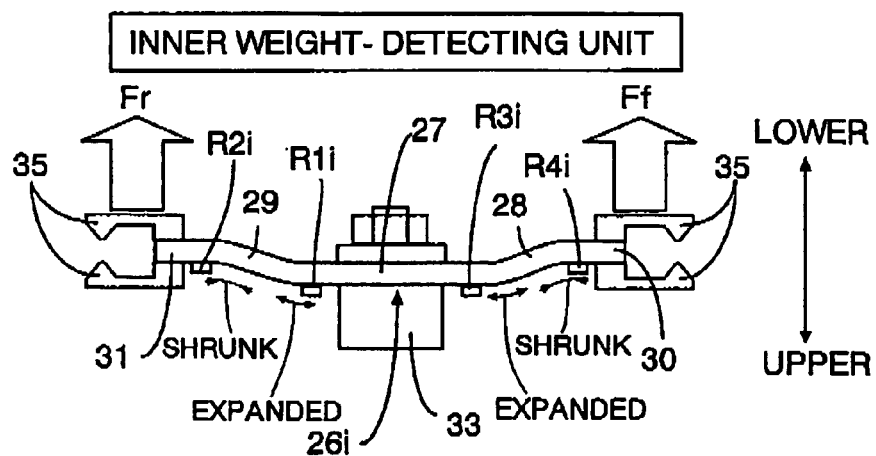
FIGS. 8A and 8B are diagrams illustrating an output characteristic of the inner weight-detecting unit due to loads.

The weight-detecting unit $12i$ on the inner side in the widthwise direction of the vehicle is the same as the weight-detecting unit $12o$ on the outer side in the widthwise direction of the vehicle, except that four resistors $R1i$ to $R4i$ are mounted on an upper surface (surfaces opposed to the sensor housing 14) of the flexing portions 28 and 29 (see FIG. 8A). The weight of an occupant is substantially equally detected by the inner and outer weight-detecting units $12o$ and $12i$.

A technique for detecting the weight of an occupant sitting on the seat S by the two weight-detecting units $12o$ and $12i$ will be described below.

Figure 6:
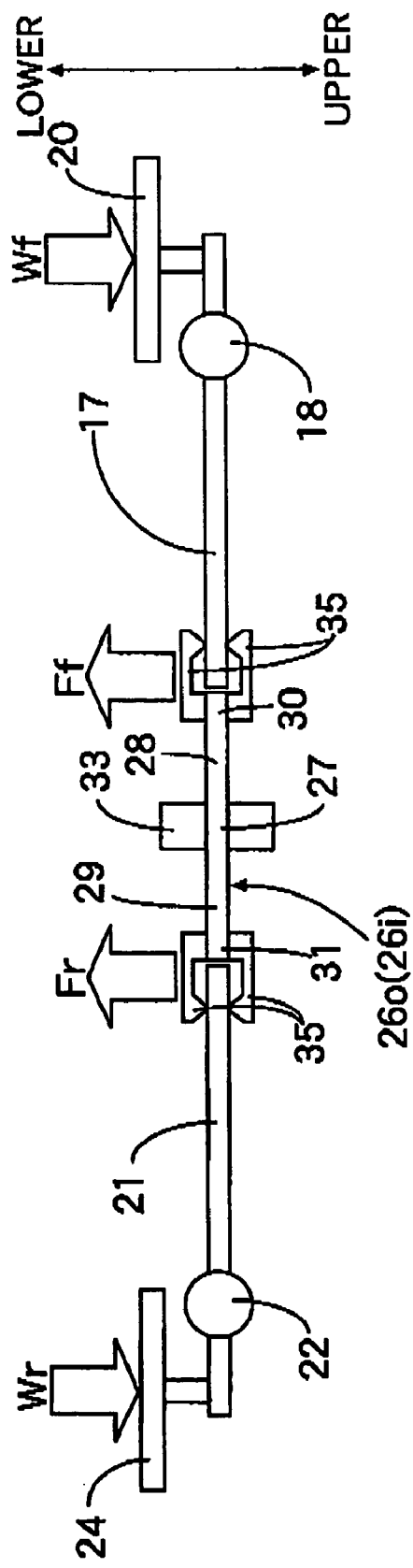
FIG. 6 is a schematic view of a weight-detecting unit.
Figure 7A:
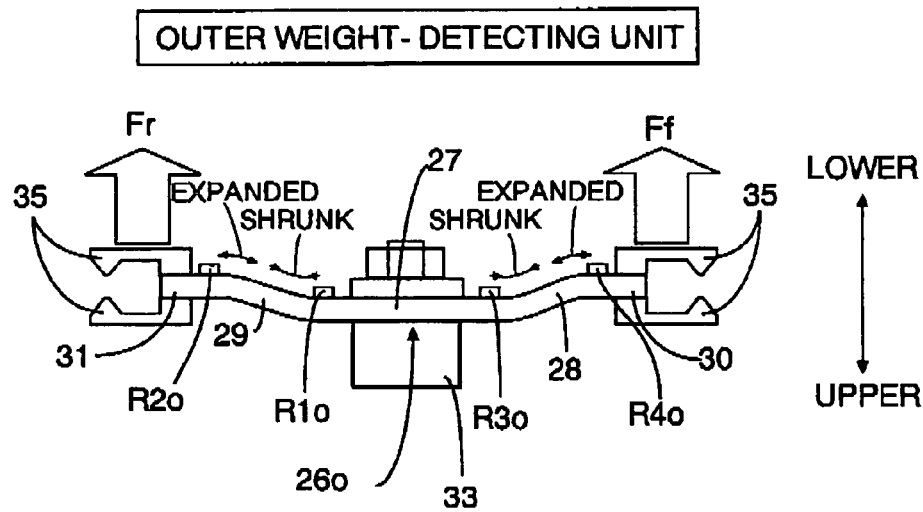
FIGS. 7A and 7B are diagrams illustrating an output characteristic of the outer weight-detecting unit due to loads.

First, the weight-detecting unit $12o$ on the outer side in the widthwise direction of the vehicle will be described with reference to FIG. 6. When the weight of an occupant is applied as Wf and Wr to the front load-receiving member 20 and the rear load-receiving member 24, respectively, the front arm member 17 and the rear arm member 21 are swung about fulcrums 18 and 22, so that the second fixing portions 30 and 31 of the sensor plate $26o$ connected to the ends of the front and rear arm members 17 and 21 are pushed down by loads Ff and Fr. As a result, as shown in FIG. 7A, the second fixing portions 30 and 31 of the sensor plate 26 are flexed about the first fixing portion 27 fixed to the center post 33, whereby the resistors $R1o$ and $R3o$ closer to the center post 33 are shrunk, and the resistors $R2o$ and $R4o$ farther from the center post 33 are expanded.

Figure 7B:
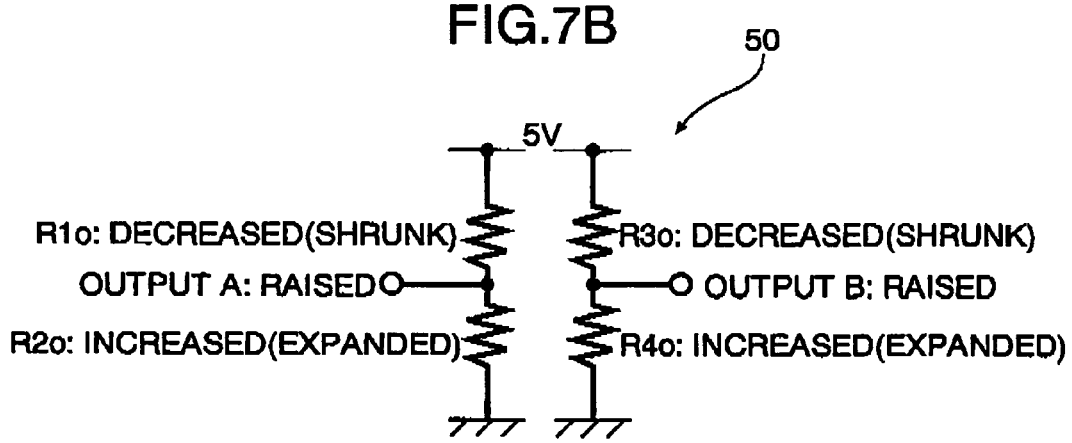

As shown in FIG. 7B, because a voltage of 5V is being applied in circuit 50 to opposite ends of the strain resistors $R1o$ and $R2o$ connected in series, the resistance value of the shrunk strain resistor $R1o$ is decreased, and the resistance value of the expanded strain resistor $R2o$ is increased. As a result, an output voltage A at an intermediate point between the strain resistors $R1o$ and $R2o$ is raised. Likewise, because a voltage of 5V is being applied to opposite ends of the strain resistors $R3o$ and $R4o$ connected in series, and the resistance value of the shrunk strain resistor $R3o$ is decreased, the resistance value of the expanded strain resistor $R4o$ is increased. As a result, an output voltage B at an intermediate point between the strain resistors $R1o$ and $R2o$ is raised. Namely, as shown by a solid line in FIG. 13A, the output voltages A and B are raised linearly in accordance with an increase in the occupant's weight applied to the weight-detecting unit 12o.

The weight-detecting unit 12i on the inner side in the widthwise direction of the vehicle will be described below. In the weight-detecting unit 12o on the outer side in the widthwise direction of the vehicle, the strain resistors R1o to R4o are mounted on the lower surface of the sensor plate 26o, but in the weight-detecting unit 12i on the inner side in the widthwise direction of the vehicle, the strain resistors R1i to R4i are mounted on the upper surface of the sensor plate 26. Therefore, as shown in FIG. 8A, when the second fixing portions 30 and 31 of the sensor plate 26o are pushed down by the loads Ff and Fr by the application of the occupant's weight as Wf and Wr to the front load-receiving member 20 and the rear load-receiving member 24 respectively, the strain resistors R1i and R3i closer to the center post 33 are expanded, and the strain resistors R2i and R4i farther from the center post 33 are shrunk.

Figure 8B:
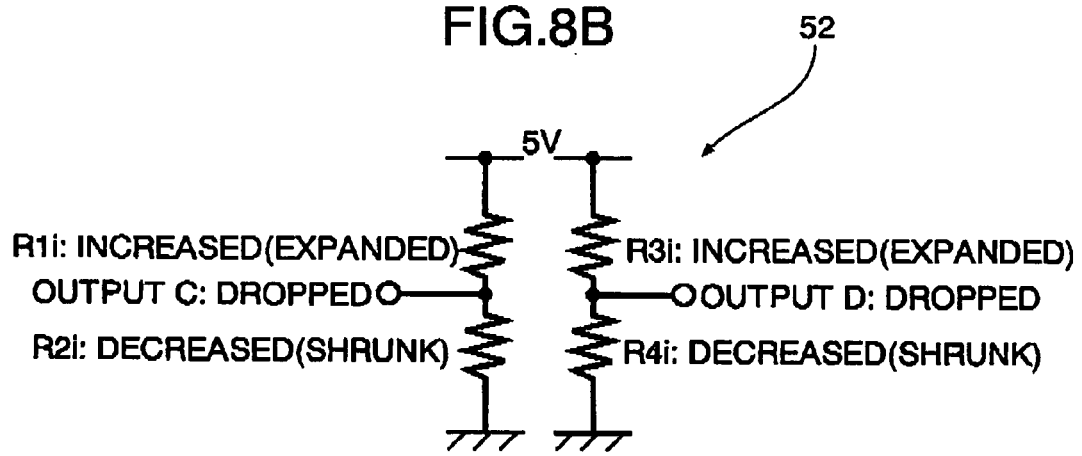

As shown in FIG. 8B, because a voltage of 5V is being applied in circuit 52 to opposite ends of the strain resistors R1i and R2i connected in series, the resistance value of the expanded strain resistor R1i is increased, and the resistance value of the shrunk strain resistor R2i is decreased. As a result, an output voltage C at an intermediate point between the strain resistors R1i and R2i is lowered. Likewise, because a voltage of 5V is being applied to opposite ends of the strain resistors R3i and R4i connected in series, the resistance value of the expanded strain resistor R3i is increased, and the resistance value of the shrunk strain resistor R4i is decreased. As a result, an output voltage D at an intermediate point between the strain resistors R3i and R4i is lowered. Namely, the output voltages C and D are lowered linearly in accordance with an increase in the occupant's weight applied to the weight-detecting unit 12i, as shown by a solid line in FIG. 14A.

Figure 9:
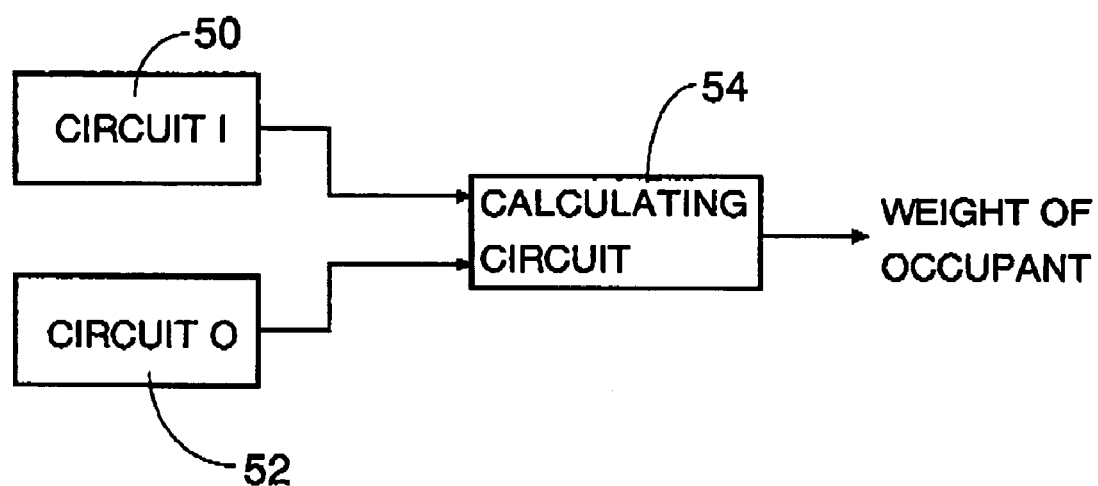
FIG. 9 illustrates the calculation of the weight of an occupant.

As shown in FIG. 9, the weight of the occupant is obtained by using the outputs of circuits 50 and 52 with a calculating circuit 54.

A change in output characteristic of each of the weight-detecting units 12o and 12i on the inner and outer sides in the widthwise direction of the vehicle due to the temperature will be described below.

Figure 10A:
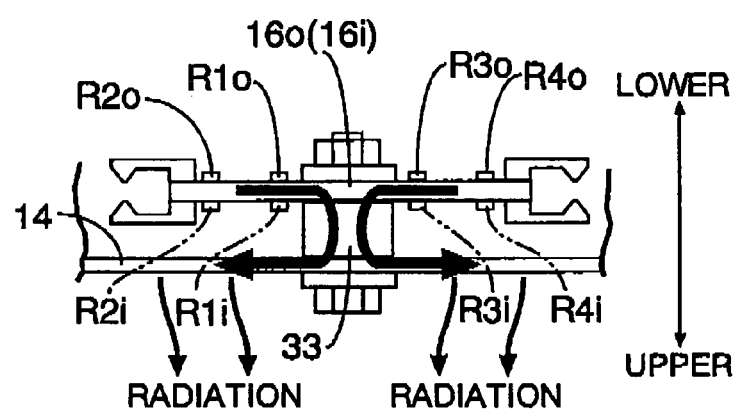
FIGS. 10A and 10B are diagrams illustrating output characteristics of the inner and outer weight-detecting units due to a temperature.

The resistance value of each of the strain resistors R1o to R4o and R1i to R4i changes not only due to the load but also due to the temperature. For example, if a door is opened in a state in which the inside of a vehicle compartment is being heated when the atmospheric temperature is low, the sensor housing 14 having a good heat-radiating property radiates its heat to lower its temperature, as shown in FIG. 10A. Accordingly, the heat flows from the second fixing portions 30 and 31 at the opposite ends of the sensor plate 26o and 26I, through the central first fixing portion 27 and the center post 33, to the sensor housing 14. Therefore, the temperatures of the strain resistors R1o, R3o, R1i and R3i closer to the sensor housing 14 are faster to drop, and the temperatures of the strain resistors R2o, R4o, R2i and R4i farther from the sensor housing 14 are slower to drop. At this time, the temperature change characteristics of the strain resistors R1o to R4o mounted on the lower surface of the sensor plate 26o become the same as the temperature change characteristics of the strain resistors R1i to R4i mounted on the upper surface of the sensor plate 26i.

Figure 10B:
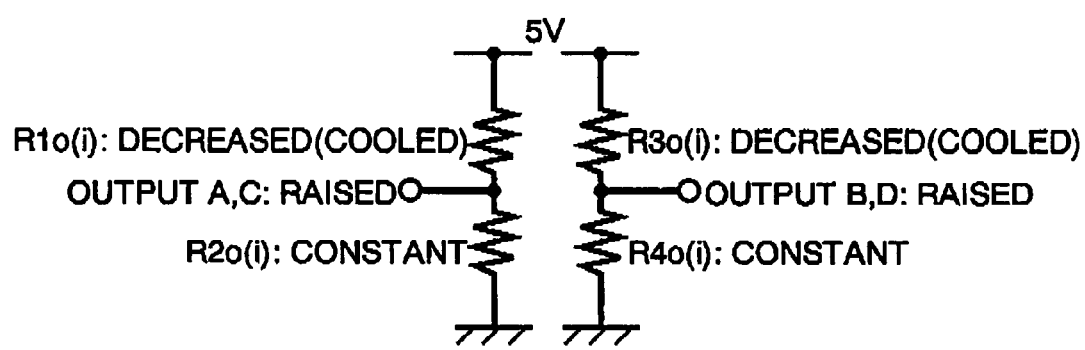

Therefore, as shown in FIG. 10B, there is developed a state in which the resistors R1o, R3o, R1i and R3i faster to be cooled have lowered temperatures and decreased resistance values, and the resistors R1o, R3o, R1i and R3i slower to be cooled have decreased resistance values and constant temperatures. As a result, the output voltages A and B in the outer sensor plate 26o and the output voltages C and D in the inner sensor plate 26i, are all raised. Namely, the inner and outer sensor plates 26o and 26i have the same characteristics of changes in output voltages A, B, C and D due to changes in temperature. Thus, when the temperature is lowered, an error in a direction of increase in the detected weight is generated (see solid lines in FIGS. 13B and 14B).

Figure 11:
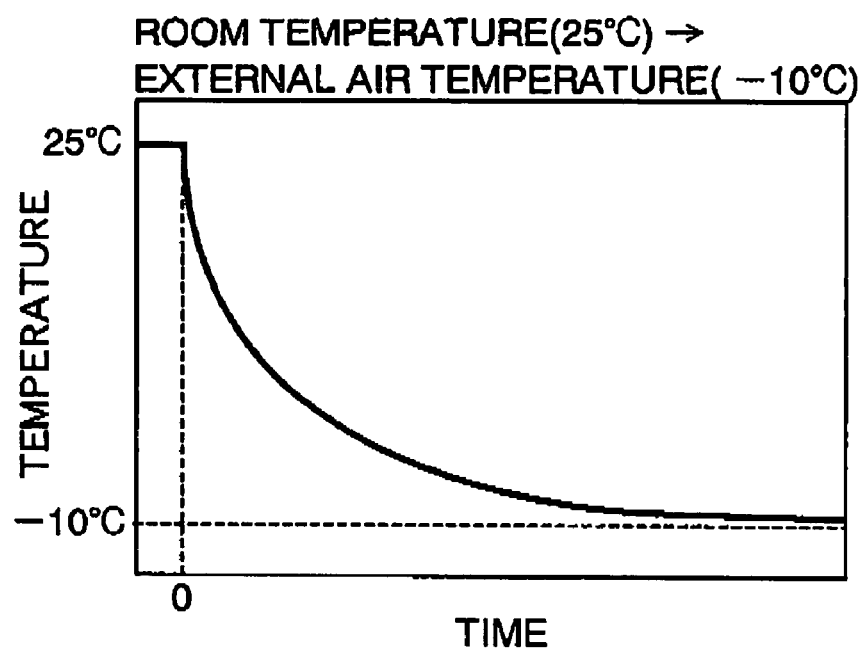
FIG. 11 is a graph showing a change in temperature at a portion in the vicinity of the seat
Figure 12:
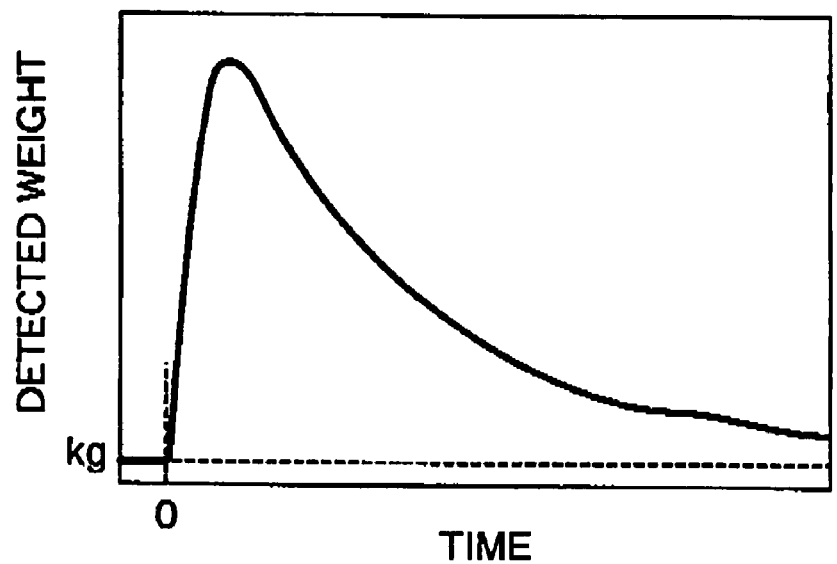
FIG. 12 is a graph showing a change in output voltage from a conventional outer weight-detecting unit when a door of a vehicle is opened during heating of a vehicle compartment.

FIG. 11 shows a situation in which the temperature around the seat S is lowered when the door is opened in a state in which a room temperature is 25° C. and an external temperature is −10° C. The temperature around the seat S is gradually lowered from the room temperature 25° C. toward the external temperature −10° C. FIG. 12 shows a characteristic of change in weight detected by the weight-detecting unit 12o, 12i with time after the opening of the door. The amount of the change in detected weight assumes the maximum value in a transition state immediately after the opening of the door, and is gradually decreased when the time is lapsed to approach a steady state.

To detect the weight of an occupant sitting on the seat S, it is necessary to add the two output voltages A and B of the outer weight-detecting unit 12o to the two output voltages C and D of the inner weight-detecting unit 12i to correspond to a total weight applied to the four load-receiving members 20, 20, 24, 24. However, the two output voltages C and D of the inner weight-detecting unit 12i have a characteristic that they are decreased with an increase in weight, so that, as shown in FIG. 14B, new output voltages C' and D' are established to have characteristics resulting from the inversion of the characteristics of the output voltages C and D from a state shown by a solid line to a state shown by a broken line.

Then, as shown in FIG. 15, the non-inversion output voltages A and B (see FIG. 13) of the outer weight-detecting unit 12o and the inverted output voltages C' and D' (see FIG. 14) of the inner weight-detecting unit 12I are added together to obtain a value: A+B+C'+D'. At this time, the value shown in FIG. 15A with respect to the load correctly corresponds to the occupant's weight, but the output voltage shown in FIG. 15B with respect to the temperature assumes a value such that the voltage (A+B) and the voltage (C'+D') are countervailed. Therefore, the generation of a detection error based on a change in temperature can be eliminated to detect the occupant's weight accurately.

As described above, it is possible to eliminate a detection error due to a change in temperature, without detecting the temperatures of the strain resistors R1o to R4o and R1i to R4i. Moreover, even in a transition state in which the temperature suddenly changes, it is possible to prevent the generation of a detection error, thereby accurately detect the weight of an occupant.

Although the embodiment of the present invention has been described in detail, it will be understood that the present invention is not limited to the above-described embodiment, and various modifications in design may be made without departing from the subject matter of the invention defined in the claims.

For example, the occupant's weight is detected in order to control the deployment of an air bag in the embodiment, but the present invention is applicable to any purpose other than the control of the deployment of the air bag.

In addition, the output voltages C and D of the inner weight-detecting unit 12i are inverted in the embodiment, but the output voltages A and B of the outer weight-detecting unit 12 may be inverted instead.

Further, the inner and outer weight-detecting units 12*o* and 12*i* includes the sensor plates 26*o* and 26*i* in the embodiment, but a common sensor plate may be used for the inner and outer weight-detecting units 12*o* and 12*i*, and strain resistors R1*o* to R4*o* and strain resistors R1*i* to R4*i* may be mounted on upper and lower surfaces, respectively, of the common sensor plate. This can contribute to a reduction in the number of parts.

Yet further, to cope with a case where a detection error is generated in a steady temperature difference, namely, a detection error is generated between a high temperature condition and a low temperature condition, thermistors may be mounted on the sensor plates 26*o* and 26*i* to correct the error. In this case, the detection errors due to differences in temperature between the strain resistors R1*o* to R4*o* and R1*i* to R4*i* and the corresponding thermistors can be corrected on the same principle as that for correcting the detection errors due to the differences in temperature between the strain resistors R1*o* to R4*o* and R1*i* to R4*i*.

What is claimed is:

1. A method for using a weight detecting system for an occupant sitting on a seat of a vehicle, comprising:

obtaining a first output from a first weight detecting unit wherein the first output changes with a change in weight;

obtaining a second output from a second weight detecting unit wherein the second output changes inversely at a rate similar to the rate at which the first output changes as weight changes, wherein the first and second weight detecting units are provided under inner and outer edges of a seat of the vehicle, respectively, wherein the first weight detecting unit provides a set of strain resistors on an opposite side of a sensor plate than that of the second weight detecting unit, wherein said first and second weight detecting units have similar characteristic of change in first and second outputs with respect to change in temperature; and calculating the weight of the occupant based on a value obtained by inverting the output from one of the first and second weight-detecting units and adding the inverted output to the output from the other weight-detecting unit.

2. A weight detecting system for detecting weight of an occupant sitting on a vehicle made to function in accordance with the method of claim 1.

3. A weight detecting system for detecting weight of an occupant sifting on a seat of a vehicle, comprising:

a first weight detecting unit having a first sensor plate and a first set of strain resistors, said first sensor plate having a first surface to which each of said first set of strain resistors are fixed, said first sensor plate being adapted to flex under the weight of the occupant, said first weight detecting unit providing an output which changes with a change in weight;

a second weight detecting unit having a second sensor plate and second set of strain resistors, said second sensor plate having a second surface to which each of said second set of strain resistors are fixed, said second sensor plate being adapted to flex under the weight of the occupant, wherein the first and second weight detecting units are provided under inner and outer edges of a seat of the vehicle, respectively, wherein said second surface on said second sensor plate is provided vertically opposite as said first surface on said first sensor plate, wherein said second weight detecting unit provides an output which changes inversely at a rate similar to the rate at which the output of said first weight detecting unit changes as weight changes, and wherein said first and second weight detecting units have similar characteristic of change of outputs with respect to change of temperature; and means for calculating the weight of the occupant based on a value obtained by inverting the output from one of the first and second weight-detecting units and adding the inverted output to the output from the other weight-detecting unit, wherein said weight characteristic of the occupant's weight detecting system is substantially temperature insensitive.

4. The weight detecting system of claim 3 wherein said first and second sensor plates have flexing portions, said first set of strain resistors being located on opposite sides of said flexing portions of said first sensor plate and said second set of strain resistors being located on opposite sides of said flexing portions of said second sensor plate.

5. The weight detecting system of claim 2, wherein the first weight-detecting unit and the second weight-detecting unit use a common sensor plate.

6. The weight detecting system of claim 3 including an automobile.

7. A method for using the weight detecting system of claim 3, comprising:

obtaining the output from the first weight detecting unit;

obtaining the output from the second weight detecting unit; and calculating the weight characteristic from the outputs of said first and second weight detecting units.

8. The weight detecting system of claim 3, wherein the first weight-detecting unit and the second weight-detecting unit use a common sensor plate.

* * * * *